Patented Sept. 12, 1933

1,926,068

UNITED STATES PATENT OFFICE 1,926,068

OXIDATION OF ALCOHOLS

Charles J. Strosacker, Chester C. Kennedy, and Earl L. Pelton, Midland, Mich., assignors to The Dow Chemical Company, Midland, Mich., a corporation of Michigan No Drawing. Application July 21, 1932
Serial No. 623,816

18 Claims. (Cl. 260—116)

The present invention concerns a method of oxidizing a mixture of aliphatic alcohols with caustic alkali to produce a lesser number of aliphatic acids therefrom.

In a co-pending application, Serial No. 566,580, filed October 2, 1931, we have shown that when a secondary alcohol, having the general formula

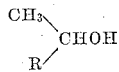

wherein R represents an alkyl group, is reacted with a fused anhydrous caustic alkali mixture at a temperature between about 200° and 325° C., methane is split from the alcohol and the latter is oxidized simultaneously to produce the alkali metal salt of the corresponding aliphatic acid having one less carbon atom than the alcohol from which it was prepared. We have since found such reaction to be of more general application; i. e., when any monohydric secondary alcohol is oxidized by caustic alkali, the shorter of the two alkyl groups linked with the carbinol group is split from the molecule to form the corresponding hydrocarbon and the remainder of the alcohol molecule is oxidized simultaneously to form an alkali metal salt of the corresponding acid. Such general reaction is illustrated by the following equation for the preparation of an alkali metal butyrate from hexanol-3:—

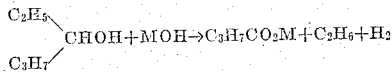

In the above equation, M represents an alkali metal.

In another co-pending application, Serial No. 595,650, filed February 27, 1932, we have disclosed that a primary aliphatic alcohol containing more than 2 carbon atoms may be reacted with a fused mixture of sodium and potassium hydroxides, at a temperature between about 250° and 325° C., to form an alkali metal salt of the corresponding aliphatic acid in excellent yield, based both on the quantity of alcohol reacted and on the quantity of alkali metal hydroxide used.

In still another co-pending application, Serial No. 593,086, filed February 2, 1932, we have described an improved method of oxidizing ethyl alcohol to form an alkali metal acetate, which method comprises gradually contacting ethyl alcohol with a fused mixture, containing not only sodium and potassium hydroxides but also the corresponding acetates, at a temperature between about 250° and 325° C. When ethyl alcohol is reacted with caustic alkali which initially contains no acetate, a very considerable portion of the alcohol is lost through the formation of by-products such as methane, ethylene, polymerized bodies, etc. The presence of acetate in the initial fused mixture serves to inhibit the formation of such by-products. However, when higher alcohols are oxidized with caustic alkali which initially contains no aliphatic acid salt, such undesirable by-products are not formed in appreciable amount, so that the initial fused mixture need not contain a salt of the desired acid product. In the same co-pending application it is disclosed that the reacted mixture, containing sodium and potassium acetates, may be dissolved in aqueous sodium hydroxide and sodium acetate, $$CH_3CO_2Na.3H_2O,$$

may be crystallized in substantially pure form from the resultant solution. The mother liquor from the crystallization may be evaporated to dryness and the residue, which contains potassium hydroxide and alkali metal acetates, may be returned to the reaction.

The present invention involves the principles set forth in the above mentioned co-pending applications, but is directed specifically to the oxidation of a mixture of aliphatic alcohols (such, for instance, as those which may be derived from petroleum hydrocarbons and cracked oil gases) to obtain a lesser number of aliphatic acids, preferably a single acid, as a product.

During cracking of a paraffin oil (e. g. kerosene) a mixture of difficultly separable olefines, such as ethylene, propylene, isomeric butylenes, isomeric amylenes, etc., is formed. It is known that such mixture of olefines may be converted, at low cost, into a mixture of alcohols containing principally ethyl alcohol and isopropyl alcohol, but containing also considerable quantities of other alcohols, such as the secondary, tertiary, and iso-forms of butyl and amyl alcohols, etc. One method of preparing such mixture of alcohols is to react the mixture of olefines, obtained through cracking oils, with sulphuric acid, and subsequently to hydrolyze the mixture of alkyl-sulphuric acid products. Other methods of preparing such alcohols from olefines are known. Also, through chlorination of petroleum hydrocarbons, particularly the lower boiling fractions of such hydrocarbons, a mixture of difficultly separable monochlorinated hydrocarbons may be obtained. Such mixture of monochlorinated products may be hydrolyzed to form a relatively inexpensive alcohol mixture consisting, usually, of ethyl, normal propyl, and isopropyl alcohols along with considerable quantities of the normal, secondary, tertiary, and iso-forms of butyl and amyl alcohols.

A mixture of aliphatic alcohols, such as either of those set forth above, may be separated completely into its components only with extreme difficulty. Such mixture may be fractionally distilled, however, so as to obtain fractions which contain but a few of the alcohols present in the initial mixture. Table 1, below, gives the boiling points of various alcohols which may be present in the alcohol mixtures described. The dotted lines in Table 1 enclose various fractions which may be obtained through fractionally distilling a mixture of the alcohols shown.

Table 1

| Alcohol | Boiling Points of Alcohols under Atmospheric Pressure °C. | | | |
|---|---|---|---|---|
| | Primary | Secondary | Tertiary | Iso- |
| Ethyl | 78.5 | | | |
| Propyl | 97.8 | 82.5 | | |
| Butyl | 117.7 | 99.5 | 82.8 | 107.3 |
| Amyl | 137.9 | 115.6 | 101.8 | 130.5 |

From the above table it may be seen that a mixture of the alcohols shown may be fractionally distilled to obtain six fractions, three of which consist principally of individual alcohols and three of which contain mixtures of alcohols. Each fraction containing a mixture of alcohols boiling at approximately the same temperature, contains such alcohols in the general relationship of a primary aliphatic alcohol having a given number of carbon atoms; a secondary alcohol having one carbon atom more than is possessed by the primary alcohol and having the general formula

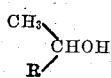

wherein R represents an alkyl group; and a tertiary alcohol having one carbon atom more than is possessed by the secondary alcohol.

We have now found that an alcohol mixture which contains a primary alcohol having the general formula $$R\text{---}CH_2OH$$

wherein R represents an alkyl group, and a secondary alcohol having the general formula

wherein R represents the same alkyl group that is represented by R in the formula for a primary alcohol and wherein R' represents an alkyl group containing no more carbon atoms than are contained in R (R' preferably represents a methyl group), and which alcohol mixture may contain a tertiary aliphatic alcohol, may be reacted with fused caustic alkali under conditions hereinafter described to form alkali metal salts of substantially a single aliphatic acid. Thus, each of the fractions enclosed by the dotted lines in Table 1 may be reacted with fused caustic alkali to obtain salts of substantially a single aliphatic acid. During reaction of fused caustic alkali with a mixture of primary, secondary, and tertiary aliphatic alcohols, in the general relationship set forth above, the primary alcohol is oxidized to form salts of the corresponding acid, no carbon atoms being lost during oxidation; the secondary alcohol has the shorter of its two alkyl groups (i. e. R' in the above structural formula) split off as a saturated hydrocarbon, the residual portion of the molecule being oxidized simultaneously to form salts of the same aliphatic acid as was formed through oxidation of the primary alcohol; and the tertiary alcohol reacts with fused caustic alkali to but slight extent, if at all, under the reaction conditions which we employ. Thus, when a mixture of ethyl, isopropyl, and tertiary butyl alcohols is reacted with fused caustic alkali according to the present method, the ethyl and isopropyl alcohols are oxidized to form alkali metal acetate and the tertiary butyl alcohol remains substantially unreacted and may be recovered in relatively pure form. Similarly, when a mixture of normal propyl, secondary butyl and tertiary amyl alcohols are reacted with fused caustic alkali according to our method, the normal propyl and secondary butyl alcohols are each oxidized to form alkali metal propionate while the tertiary amyl alcohol remains substantially unreacted and may be recovered in relatively pure form. The reactions for the simultaneous oxidation of primary and secondary alcohols are illustrated by the following equations which represent the principal reactions that take place when a mixture of normal propyl alcohol and secondary butyl alcohol is reacted with fused caustic alkali under the reaction conditions hereinafter stated;

(1) $C_2H_5\text{---}CH_2OH + MOH \rightarrow C_2H_5CO_2M + 2H_2$

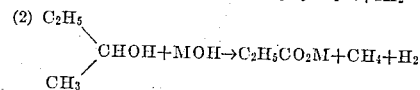

In the above equations, M represents an alkali metal.

We have further found that when a mixture of aliphatic alcohols, containing at least a primary and a secondary alcohol in the relationship already stated, is reacted with fused caustic alkali, the salts of a lesser number of aliphatic acids may be formed. For instance, if a mixture containing the eleven alcohols set forth in Table 1 is reacted with fused caustic alkali, salts of not more than six aliphatic acids are formed as principal acid products.

We have found, still further, that when a mixture of a primary alcohol and a secondary alcohol, in the relationship set forth above, is reacted with fused caustic alkali according to the method herein disclosed, the primary alcohol is oxidized much more rapidly than is the secondary alcohol, hence a portion of the latter may be obtained in purified form through partial oxidation of such mixture according to the present method.

The present invention, then, consists of a method of oxidizing a mixture of aliphatic alcohols to obtain a lesser number of aliphatic acids as principal products, which method may be modified so as to effect simultaneously the purification of either a tertiary aliphatic alcohol or a secondary aliphatic alcohol, said method being hereinafter fully described and particularly pointed out in the claims.

The following description and examples set forth in detail but several of the various ways in which the principle of our invention may be employed. It is to be understood, however, that said detailed description and examples are purely illustrative and are not to be construed as a limitation upon our invention.

We employ the following general method in preparing aliphatic acids from a mixture of alcohols. A mixture of sodium and potassium hydroxides in respective quantities between the ratios of about

and about

is heated to fusion in a suitable closed reactor provided with a mechanical stirrer, an inlet for alcohol, and an outlet for gaseous products. The fused alkaline mixture is stirred vigorously and an aliphatic alcohol mixture, containing a primary alcohol having the general formula $$R-CH_2OH$$

and a secondary alcohol having the general formula

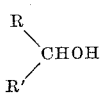

in each of which formulæ R represents the same alkyl group and in the second of which formulæ R' represents an alkyl group (preferably methyl) containing not more than the number of carbon atoms present in R, is gradually contacted therewith. The reaction mixture is maintained at a temperature between about 250° and about 300° C. (preferably between about 280° and about 300° C.) during the course of the reaction. The introduction of alcohol is continued, preferably, until from about 85 to 95 per cent of the caustic alkali initially employed is reacted.

Under optimum operating conditions substantially all of the primary and secondary alcohols present in the initial alcohol mixture may be reacted directly with the fused caustic alkali, but ordinarily a portion of such alcohols may pass through the reactor unreacted. The unreacted alcohols may be condensed from their admixture with hydrogen and gaseous hydrocarbons, which are generated during the reaction, and be returned to the reactor until substantially all of the primary and secondary alcohols are oxidized to form alkali metal salts of aliphatic acids. Any tertiary alcohols which may be present distill from the mixture and may be condensed in a form relatively free from primary and secondary alcohols.

While the above general method may be applied successfully for the preparation of alkali metal salts of any aliphatic acid through oxidation of the necessary primary and secondary alcohols, we find it highly advantageous, when preparing acetic acid from an alcohol mixture which contains ethyl alcohol, to employ an initial fused alkaline mixture containing both hydroxides and acetates of sodium and potassium. The alkali metal content of such initial fused mixture consists, preferably, of sodium and potassium in respective amounts between the ratios of about

and

and said initial fused mixture contains at least 1 mole (preferably about 3.5 moles) of alkali metal acetate to every 9 moles of alkali metal hydroxide present. As previously pointed out, alkali metal acetate in the initial reaction mixture prevents loss of ethyl alcohol through side reactions, such as the formation of methane, ethylene, polymerized bodies, etc. Otherwise the procedure employed in preparing an alkali metal acetate is similar to the general procedure already described.

After the desired quantity of alcohol is reacted, the aliphatic acid products, or alkali metal salts of such acids, may be separated in any of a variety of ways. If either an alkali metal acetate or an alkali metal propionate is the product from the above described reaction, the reacted mixture may be dissolved in aqueous sodium hydroxide (preferably, but not necessarily, containing sodium hydroxide in amount approximately equivalent to the alkali metal hydroxide reacted) and the sodium salt of the aliphatic acid may be crystallized from the resultant solution in substantially pure form. The mother liquor from such crystallization may be evaporated to dryness and the residue, which contains the potassium hydroxide initially employed in the reaction as well as some sodium hydroxide and alkali metal salts of the aliphatic acid product, may be returned to the initial reaction. Such mode of separating the reaction product is similar to that described in our co-pending application, Serial No. 593,086, previously referred to, but provides further for the direct production of either sodium acetate or sodium propionate from mixtures of alcohols.

In place of separating the aliphatic acid products in the form of their sodium salts, as described above for the direct production of sodium acetate and sodium propionate, such products may be separated as the free acids. The crude alkaline reaction mixture may, for instance, be acidified with a strong mineral acid, such as sulphuric or hydrochloric acid, and the aliphatic acids be separated through distilling the acidified mixture, through extracting the latter with an organic solvent and distilling the extracts, or through other known procedure. Such usual modes of separation are somewhat disadvantageous in that during acidification of the alkaline mixture some water is formed and distills with the aliphatic acid product. Complete removal of such water from the products may be accomplished only with difficulty. Furthermore, the crude reaction mixture sometimes contains a relatively small quantity of unreacted alcohol. This alcohol, if present during acidification, may esterify a portion of the aliphatic acid products during the steps of separating the latter as free compounds. In such case the products will be contaminated somewhat by the presence of the esters formed. In order to avoid such contamination and at the same time obtain the acid products in anhydrous form, we have found that the heated and stirred reaction mixture may advantageously be treated with an aqueous solution of an aliphatic acid (preferably corresponding to an acid formed during oxidation of the alcohol mixture) in quantity sufficient substantially to neutralize the mixture. During the course of such neutralization, the water added is vaporized and effectively steam distills all unreacted alcohol from the mixture. Heating of the fused mixture is continued until practically all water is vaporized therefrom. The mixture is then cooled to solidification, pulverized, acidified with a strong mineral acid such as gaseous hydrogen chloride or concentrated sulphuric acid (preferably the latter), and the aliphatic acids are distilled from the acidified mixture. When sulphuric acid is employed to acidify the neutralized reaction mixture, the latter should be cooled to a temperature sufficiently low so that the components thereof will not be oxidized by sulphuric acid, prior to adding said acids thereto.

When a mixture of aliphatic acids is formed according to the present method, such mixture may, ordinarily, be separated into its components through fractional distillation of the free acids.

The following examples illustrate two of the various ways in which the principle of our invention may be employed:—

*Example 1*

In a horizontal nickel reactor, provided with a mechanical stirrer, an inlet for alcohols and an outlet for gaseous by-products, was placed 605 grams (7.38 moles) of anhydrous sodium acetate, 100 grams (2.5 moles) of sodium hydroxide, and 280 grams (5.0 moles) of potassium hydroxide. The mixture was heated to fusion, stirred, and maintained at approximately 295° C. while an alcohol mixture consisting of 276 grams (6.0 moles) of ethyl alcohol and 360 grams (6.0 moles) of isopropyl alcohol was introduced thereto at constant rate during a period of about 6.5 hours. During reaction, approximately 5.1 moles of alcohol containing about 3.7 moles of the isopropyl alcohol and 1.4 moles of the ethyl alcohol employed vaporized from the reactor and was recovered as unreacted material. After reaction the alkaline mixture was analyzed and found to contain 13.37 moles of alkali metal acetate and 1.11 moles of alkali metal hydroxide. During reaction, approximately 6.9 moles of alcohol (i. e. about 2.3 moles of isopropyl alcohol and about 4.6 moles of ethyl alcohol) was reacted to form substantially 6.0 moles of alkali metal acetate, the yield of the latter being 87 per cent of theoretical, based on the quantity of alcohol reacted.

*Example 2*

In a manner similar to that described in Example 1, an alcohol mixture consisting of 6.37 moles of normal propyl alcohol and 6.16 moles of secondary butyl alcohol was contacted with a fused and stirred mixture initially consisting of approximately 7 moles of sodium hydroxide and 3.5 moles of potassium hydroxide. Approximately 0.89 mole of propyl alcohol and 3.59 moles of secondary butyl alcohol vaporized from the reactor and was recovered as unreacted alcohol. After reaction, the alkaline mixture was analyzed and found to contain 7.97 moles of alkali metal propionate and 2.49 moles of unreacted alkali metal hydroxide. The yield of propionate was 98.9 per cent of theoretical, based on the quantity of alcohol reacted.

The principle of our invention may be practiced in ways other than those previously described. A mixture of the higher primary and secondary aliphatic alcohols (e. g. a mixture containing heptanol-1 and octanol-2) may, for instance, be reacted with fused caustic alkali to form salts of a lesser number of aliphatic acids (e. g. heptanoic acid) as reaction products.

We have previously pointed out that a fused caustic alkali mixture, containing sodium and potassium compounds in a ratio between about $$\frac{1Na}{2K}$$

and about $$\frac{3Na}{1K},$$

may be employed as an agent for the oxidation of alcohols according to our method. When certain alcohols, e. g. some of the higher aliphatic alcohols, are to be oxidized according to the present method and caustic alkali mixtures containing sodium and potassium compounds in a ratio appreciably greater than $$\frac{1Na}{1K}$$

are employed as oxidizing agents, the reaction mixture may become thick and difficult to stir as the reaction proceeds, and, indeed, may sometimes even solidify. If a reaction mixture becomes difficult to stir, it may be made more liquid by adding either the alkali metal hydroxide or the alkali metal salt of an aliphatic acid product required to shift the ratio of sodium and potassium compounds in the reaction mixture toward an equimolecular basis. We frequently find it advantageous, however, to avoid difficulties such as those last described by employing a fused caustic alkali mixture which initially contains the necessary sodium and potassium compounds in respective amounts between the ratios of about $$\frac{1Na}{1K}$$

and about $$\frac{1Na}{2K}.$$

In contrast to those instances in which the reaction mixture tends to thicken and even solidify as the reaction proceeds, there are instances (particularly during the oxidation of certain of the higher alcohols) in which the alkali metal salts of the acid products, as they are formed, tend to thin down or further liquefy the reaction mixture at the temperature employed. In some such instances, the liquefying action of the salt products may be sufficient so that pure sodium hydroxide, rather than a mixture of sodium and potassium hydroxides, may be employed as an oxidizing agent. The present invention comprises the oxidation of mixed primary and secondary alcohols with fused caustic alkali, whether the caustic alkali employed consists of a single alkali metal hydroxide or a mixture of two or more alkali metal hydroxides.

Although any reaction temperature between about 250° and 300° C. may be employed in practicing our invention, and temperatures outside that range may sometimes be employed successfully, we prefer to maintain the reaction mixture at a temperature between about 280° and 300° C. When the reaction temperature is maintained below about 280° C. the reaction may become sluggish so that the time required for substantially complete reaction is increased materially. When all of the reactants employed are substantially anhydrous and the temperature is increased materially above 300° C., the alkali metal salt of the aliphatic acid may decompose materially to form undesirable by-products such as carbonates.

The reactants employed in our improved process may contain a relatively small proportion of water, the presence of which, we have observed, tends to inhibit the decomposition and over-oxidation of the desired products. If, for instance, the alcohol mixture employed contains an appreciable quantity (2 to 8 per cent) of water, or if the fused alkaline mixture is substantially saturated with water under the reaction conditions maintained, the reaction temperature may be raised to about 325° C. without material decomposition or over-oxidation of the product occurring. Apparently water tends to prevent undesirable side reactions but at the same time tends to slow up the principal reaction. The presence of a relatively small quantity of water in the reaction mixture, therefore, may at times be highly desirable, although the presence of any considerable quantity (e. g. more than about 15 per cent water in the fused alkaline mixture or more than about 8 per cent water in the alcohol mixture) should be avoided.

It is important to stir the fused reaction mixture vigorously during addition of the alcohol mixture, so as to contact unreacted hydroxide continually with the alcohol. While the reaction will occur under the operating conditions previously described, even though the mixture is not stirred, stirring maintains the mixture in a substantially homogeneous condition, prevents local overheating of the fused mixture and the resultant decomposition of the desired product, and, in general, aids in obtaining smooth reaction betwen the alcohol mixture and the caustic alkali.

The reactions described in the specific examples were each carried out under approximately atmospheric pressure. The invention, however, is not limited to the employment of atmospheric pressure for such purpose as such reactions may also be carried out under either reduced or increased pressure.

From each of the specific examples it may be seen that when a mixture of a normal aliphatic alcohol and the next higher secondary alcohol is reacted with fused caustic alkali, the normal alcohol is oxidized much more rapidly than is the secondary alcohol, hence at least a partial separation of the secondary alcohol may be effected. The present invention, then, not only comprises a method of oxidizing a mixture of aliphatic alcohols to form a lesser number of aliphatic acids, but the invention further comprises a method of separating tertiary aliphatic alcohols from closely related primary and secondary alcohols and a method of separating secondary aliphatic alcohols from closely related primary alcohols.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of making a compound having the general formula

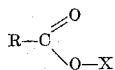

wherein R represents an alkyl group and X represents hydrogen or an alkali metal, the step which consists in reacting an alcohol mixture, containing a primary aliphatic alcohol having the general formula

R—CH₂OH and a secondary aliphatic alcohol having the general formula

in each of which formulæ R represents the same alkyl group and in the second of which formulæ R' represents an alkyl group having not more than the number of carbon atoms contained in R, with fused caustic alkali.

2. In a method of making a compound having the general formula

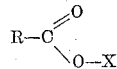

wherein R represents an alkyl group and X represents hydrogen or an alkali metal, the step which consists in reacting an alcohol mixture, containing a primary aliphatic alcohol having the general formula

R—CH₂OH and a secondary aliphatic alcohol having the general formula

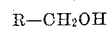

in each of which formulæ R represents the same alkyl group and in the second of which formulæ R' represents an alkyl group having not more than the number of carbon atoms contained in R, with fused alkali metal hydroxide at a temperature between about 250° and about 325° C.

3. In a method of making a compound having the general formula

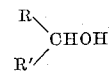

wherein X represents hydrogen or an alkali metal, the step which consists in reacting an alcohol mixture, containing a primary aliphatic alcohol having the general formula

R—CH₂—OH and a secondary aliphatic alcohol having the general formula

in each of which formulæ R represents the same alkyl group and in the latter of which formulæ R' represents an alkyl group having not more than the number of carbon atoms contained in R, with a fused mixture initially containing sodium and potassium hydroxides, the alkali metal content of said fused mixture consisting of sodium and potassium in a ratio between about

and about

and the reaction mixture being maintained at a temperature between about 250° and about 300° C. during the course of the reaction.

4. In a method of making an alkali metal salt of an aliphatic acid, the steps which consist in reacting an alcohol mixture, containing a primary aliphatic alcohol having the general formula

R—CH₂OH and a secondary aliphatic alcohol having the general formula

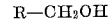

in each of which formulæ R represents the same alkyl group containing more than 1 carbon atom, with a fused caustic alkali mixture initially containing sodium and potassium hydroxides in a molecular ratio between about $$\frac{1\text{NaOH}}{2\text{KOH}}$$

and about $$\frac{3\text{NaOH}}{1\text{KOH}},$$

the alkaline mixture being maintained at a temperature between about 250° and about 300° C. during the course of the reaction.

5. In a method of making an alkali metal salt of an aliphatic acid, the steps which consist in reacting an alcohol mixture, containing a primary aliphatic alcohol having the general formula $$\text{R—CH}_2\text{OH}$$

and a secondary aliphatic alcohol having the general formula $$\begin{array}{c}\text{R}\\\phantom{\text{CH}_3}\diagdown\\\phantom{\text{CH}_3}\phantom{\diagdown}\text{CHOH}\\\text{CH}_3\diagup\end{array}$$

in each of which formulæ R represents the same alkyl group containing more than 1 carbon atom, with a fused caustic alkali mixture initially containing sodium and potassium hydroxides in a molecular ratio between about $$\frac{1\text{NaOH}}{2\text{KOH}}$$

and about $$\frac{1\text{NaOH}}{1\text{KOH}},$$

stirring the fused mixture and maintaining the same at a temperature between about 280° and about 300° C. during the course of the reaction, condensing unreacted alcohol from the gases evolved during reaction and returning the condensed alcohol to the reaction.

6. In a method of making an alkali metal salt of an aliphatic acid and simultaneously separating a tertiary aliphatic alcohol from a mixture thereof with primary and secondary aliphatic alcohols, the steps which consist in reacting an alcohol mixture, containing a tertiary aliphatic alcohol, a primary aliphatic alcohol having the general formula $$\text{R—CH}_2\text{OH}$$

and a secondary aliphatic alcohol having the general formula $$\begin{array}{c}\text{R}\diagdown\\\phantom{\text{R}}\text{CHOH}\\\text{R}'\diagup\end{array}$$

in each of which formulæ R represents the same alkyl group and in the latter of which formulæ R' represents an alkyl group containing not more than the number of carbon atoms contained in R, with a fused mixture initially containing sodium and potassium hydroxides, the alkali metal content of said fused mixture consisting of sodium and potassium in a ratio between about $$\frac{1\text{Na}}{2\text{K}}$$

and about $$\frac{3\text{Na}}{1\text{K}},$$

maintaining the alkaline mixture at a temperature between about 250° and about 325° C. during reaction, condensing unreacted alcohols from gases evolved from the reaction, returning the condensed alcohols to the reaction until the primary and secondary alcohols are substantially reacted, and condensing the unreacted tertiary alcohol which subsequently distills from the reaction mixture.

7. In a method of making an alkali metal salt of an aliphatic acid and simultaneously separating a tertiary aliphatic alcohol from a mixture thereof with primary and secondary aliphatic alcohols, the steps which consist in reacting an alcohol mixture, containing a tertiary aliphatic alcohol, a primary aliphatic alcohol having the general formula $$\text{R—CH}_2\text{OH}$$

and a secondary aliphatic alcohol having the general formula $$\begin{array}{c}\text{R}\diagdown\\\phantom{\text{R}}\text{CHOH}\\\text{R}'\diagup\end{array}$$

in each of which formulæ R represents the same alkyl group and in the second of which formulæ R' represents an alkyl group containing not more than the number of carbon atoms contained in R, with a fused mixture initially containing sodium and potassium hydroxides in molecular ratio between about $$\frac{1\text{NaOH}}{2\text{KOH}}$$

and about $$\frac{1\text{NaOH}}{1\text{KOH}},$$

maintaining the alkaline mixture at a temperature between about 280° and about 300° C. during reaction, condensing unreacted alcohols from gases evolved from the reaction, returning the condensed alcohols to the reaction until the primary and secondary alcohols are substantially reacted, and condensing the unreacted tertiary alcohol which subsequently distills from the reaction mixture.

8. In a method of making an alkali metal salt of an aliphatic acid and simultaneously separating a secondary aliphatic alcohol from a mixture thereof with a primary alcohol, the steps which consist in reacting a mixture of a primary aliphatic alcohol having the general formula $$\text{R—CH}_2\text{OH}$$

and a secondary aliphatic alcohol having the general formula $$\begin{array}{c}\text{R}\diagdown\\\phantom{\text{R}}\text{CHOH}\\\text{R}'\diagup\end{array}$$

in each of which formulæ R represents the same alkyl group and in the second of which formulæ R' represents an alkyl group containing not more than the number of carbon atoms contained in R, with a fused mixture initially containing sodium and potassium hydroxides, the alkali metal content of said fused mixture consisting of sodium and potassium in a ratio between about $$\frac{1\text{Na}}{2\text{K}}$$

and about $$\frac{3\text{Na}}{1\text{K}},$$

maintaining the alkaline mixture at a temperature between about 250° and about 300° C. during reaction, condensing unreacted alcohols from gases evolved from the reaction, returning the condensed alcohols to the reaction until the primary alcohol is substantially reacted, and condensing unreacted secondary alcohol which subsequently distills from the reaction mixture.

9. In a method of making an acetate having the formula

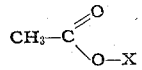

wherein X represents hydrogen or an alkali metal, the step which consists in reacting an alcohol solution containing ethyl and isopropyl alcohols with fused alkali metal hydroxide at a temperature between about 250° and about 325° C.

10. In a method of making an alkali metal acetate, the step which consists in reacting an alcohol solution containing ethyl and isopropyl alcohols with a fused mixture initially containing both sodium and potassium hydroxides and sodium and potassium acetates at a temperature between about 250° and about 300° C.

11. In a method of making sodium acetate, the steps which consist in reacting a solution of ethyl and isopropyl alcohols with a fused mixture which initially contains alkali metal acetates and hydroxides, wherein the alkali metal portion consists of sodium and potassium in a ratio between about $$\frac{1Na}{2K}$$

and about $$\frac{3Na}{1K}$$

and wherein at least 1 mole of acetate is present for every 9 moles of hydroxide in the initial fused mixture, the reaction mixture being maintained at a temperature between about 250° and about 300° C. during the course of the reaction.

12. In a cyclic method of making sodium acetate, the steps which consist in reacting a solution of ethyl and isopropyl alcohols with a fused mixture which initially contains alkali metal acetates and hydroxides, the alkali metal portion of said fused mixture consisting of sodium and potassium in a ratio between about $$\frac{1Na}{2K}$$

and about $$\frac{3Na}{1K}$$

and at least 1 mole of acetate being present for every 9 moles of hydroxide in the initial fused mixture, stirring said mixture and maintaining the same at a temperature between about 250° and about 300° C. during the course of the reaction, condensing unreacted alcohols from gases evolved from the mixture during reaction, returning the condensed alcohols to the reaction, dissolving the reacted mass in aqueous sodium hydroxide, crystallizing and separating sodium acetate from the resultant solution, evaporating the mother liquor to dryness, and returning the residue to the process.

13. In a method of making acetic acid, the steps which consist in reacting an alcohol solution containing ethyl and isopropyl alcohols with a fused mixture which initially contains alkali metal acetates and hydroxides, the alkali metal portion of said fused mixture consisting of sodium and potassium in a ratio between about $$\frac{1Na}{2K}$$

and about $$\frac{3Na}{1K}$$

and at least 1 mole of acetate being present for every 9 moles of hydroxide in the initial fused mixture, stirring said mixture and maintaining the same at a temperature between about 250° and about 300° C. during the course of the reaction, substantially neutralizing the reacted mixture with acetic acid, heating the neutralized mixture to remove moisture therefrom, cooling to solidification, acidifying with a concentrated strong mineral acid, and distilling acetic acid from the acidified mass.

14. In a method of making a propionate having the formula

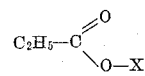

wherein X represents hydrogen or an alkali metal, the step which consists in reacting an alcohol solution containing normal propyl and secondary butyl alcohols with fused alkali metal hydroxide at a temperature between about 250° and 325° C.

15. In a method of making an alkali-metal propionate, the step which consists in reacting an alcohol solution containing normal propyl and secondary butyl alcohols with a fused mixture of sodium and potassium hydroxides at a temperature between about 250° and 300° C.

16. In a method of making sodium propionate, the steps which consist in reacting a solution of normal propyl and secondary butyl alcohols with a fused mixture which initially contains sodium and potassium hydroxides in a molecular ratio between about $$\frac{1NaOH}{2KOH}$$

and about $$\frac{3NaOH}{1KOH},$$

the mixture being maintained at a temperature between about 250° and 300° C. during the course of the reaction.

17. In a cyclic method of making sodium propionate, the steps which consist in reacting a solution of normal propyl and secondary butyl alcohols with a fused mixture which initially contains sodium and potassium hydroxides in a molecular ratio between about $$\frac{1NaOH}{2KOH}$$

and about $$\frac{3NaOH}{1KOH},$$

stirring the reaction mixture and maintaining the same at a temperature between about 250° and about 300° C. during the course of the reaction, condensing unreacted alcohols from gases evolved from the mixture during the reaction, returning the condensed alcohols to the reaction, dissolving the reacted mass in aqueous sodium hydroxide, crystallizing and separating sodium propionate from the resultant solution, evaporating the mother liquor remaining after such crystallization to dryness and returning the residue to the process.

18. In a method of making propionic acid, the steps which consist in reacting an alcohol solution containing normal propyl and secondary butyl alcohols with a fused mixture which initially contains sodium and potassium hydroxides in a molecular ratio between about $$\frac{1\text{NaOH}}{2\text{KOH}}$$

and about $$\frac{3\text{NaOH}}{1\text{KOH}},$$

stirring said mixture and maintaining the same at a temperature between about 250° and 300° C. during the course of the reaction, substantially neutralizing the reacted mixture with propionic acid, heating the neutralized mixture to remove moisture therefrom, cooling to solidification, acidifying with a concentrated strong mineral acid, and distilling propionic acid from the acidified mass.

CHARLES J. STROSACKER.
CHESTER C. KENNEDY.
EARL L. PELTON.